Jan. 3, 1939.　　　　　G. GARDNER　　　　　2,142,124
ANGLE MEASURING DEVICE
Filed Oct. 20, 1937　　　　2 Sheets-Sheet 1
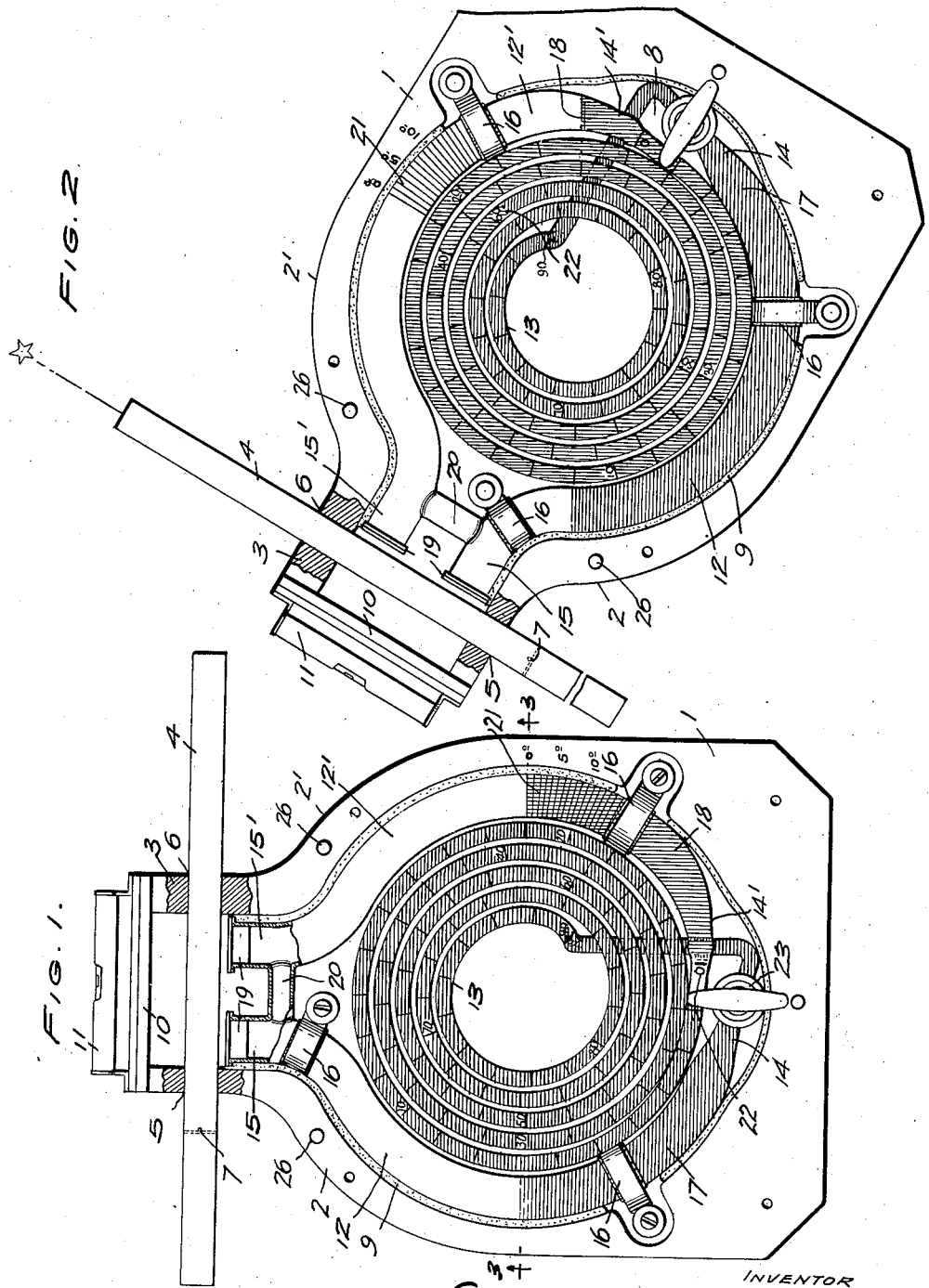
INVENTOR
GRANDISON GARDNER
BY
ATTORNEYS Jan. 3, 1939. G. GARDNER 2,142,124
ANGLE MEASURING DEVICE
Filed Oct. 20, 1937 2 Sheets-Sheet 2
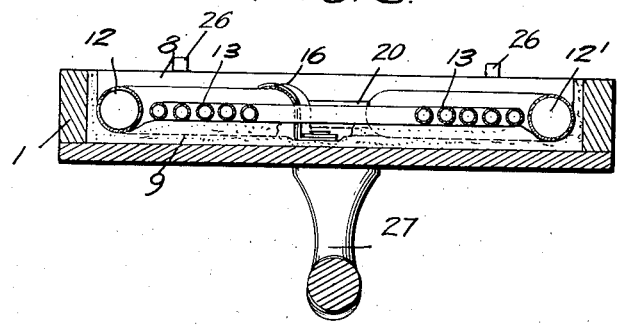
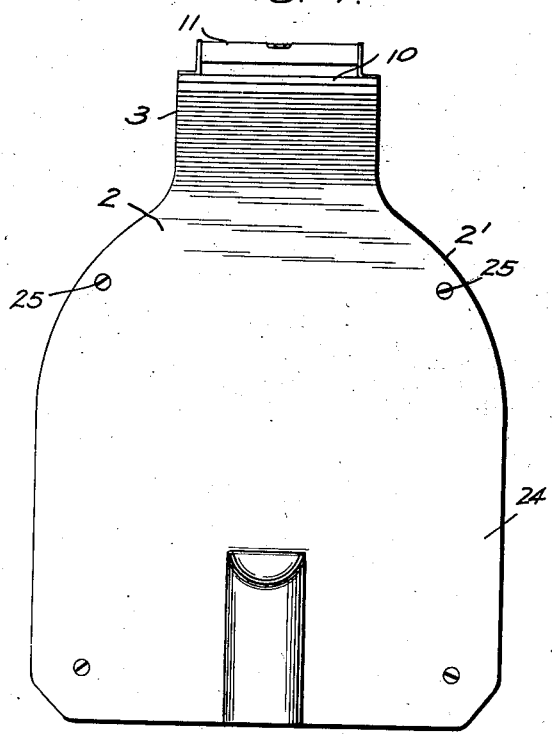
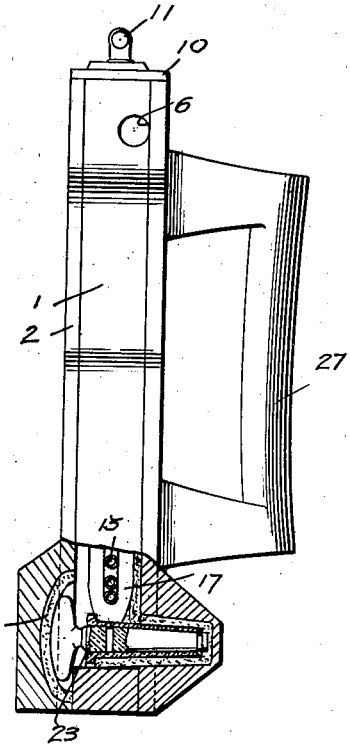
INVENTOR
GRANDISON GARDNER
ATTORNEYS Patented Jan. 3, 1939

2,142,124

UNITED STATES PATENT OFFICE 2,142,124

ANGLE MEASURING DEVICE

Grandison Gardner, March Field, Calif.

Application October 20, 1937, Serial No. 170,016

7 Claims. (Cl. 33—70)

(Granted under the act of March 3, 1883, as amended April 30, 1928; 370 O. G. 757)

The invention described herein may be manufactured and used by or for the Government for governmental purposes, without the payment to me of any royalty thereon.

This invention has reference to angle measuring devices and especially to astronomical angle measuring devices such as are used by navigators in determining position by astronomical observations.

An object of the invention is to provide a simple and novel type of angle measuring device by means of which astronomical observations can be taken and an altitude reading obtained by sighting directly on a star or other celestial body selected as a point of observation and without the disadvantages, present in conventional inclinometers and astronomical sextants, octants, etc., of observing a bubble or horizon simultaneously with the star or other point of observation.

A further object of the invention is to provide an astronomical angle measuring device which is especially suited for use either day or night as an aircraft sextant and which is an improvement over the conventional bubble sextant in that it not only provides a means of viewing the celestial body direct instead of its reflection but also eliminates, by avoiding the use of the bubble horizon, the difficult problem of illuminating the bubble.

With the above in view, the invention provides a liquid level inclinometer and star altitude meter in which a conventional telescope or other sighting means is combined with a liquid angle-indicating mechanism so arranged that the angle is set automatically and is held by means of a stop cock until convenient to read it. The invention also includes means of magnifying the angle indication to permit any degree of precision in reading it.

The objects and advantages of the invention are accomplished by means of the novel structure and relative arrangement of parts hereinafter set forth and described in detail, with reference to the accompanying drawings, wherein:

Figure 1 is a side view of an angle measuring instrument constructed in accordance with the invention, the same being shown in non-sighted or "zero" position with the lid of the instrument removed.

Figure 2 is a view similar to Figure 1 but showing the instrument inclined to the horizontal or at the instant of taking a sight.

Figure 3 is a cross section of the instrument, taken on line 3—3 of Figure 1, showing part of the handle on the back of the instrument case.

Figure 4 is a view, in side elevation, of the instrument with the lid shown attached to the instrument case, and Figure 5 is an end view of the instrument with the case shown partly in section to disclose the stop cock.

The instrument comprises essentially a frame or body, a sighting device, and a liquid angle indicator. The body may be formed of wood or any other selected material suitable for the purpose and may be of any convenient shape or design. The sighting device may be a telescope, a sighting tube, or an open sight. The liquid angle indicator includes a glass tubing containing two liquids with a visible line of separation to serve as an angle index line; the glass tubing consisting of two differently sized sections so joined that the change in level position of liquid in the larger section is magnified several fold in the smaller section.

In the construction illustrated in the accompanying drawings, the body of the instrument is represented as being composed of a shallow box-like receptacle or case 1, having the side edges 2—2' converging and prolonged at one end of the case to provide a reduced part or shank 3; the latter serving to removably support the sighting means which consists of a sighting tube 4 disposed crosswise of the shank within suitable openings 5 and 6. The sighting tube is provided with the conventional cross wires 7. The recess or cavity 8 in the open side of the case is substantially circular to conform to and snugly receive the glass tubing of the liquid angle indicator which rests upon a felt padding or other cushion 9 with which the cavity is lined. The cavity is extended through the shank 3 of the instrument case and is closed at the outer end of the shank by a removable bridge strip or cap piece 10 upon the outer face of which is mounted a bubble level 11. The tubing is composed of a pair of large tubes 12 and 12' bent on the arc of a circle of any convenient radius and a smaller tube 13 connecting the ends 14—14' of the larger tubes. The smaller tube 13 is shown as a coil but need not be bent to any specific shape as its length is its only essential feature. The tubing is arranged in the cavity 8 of the instrument case with its free open ends 15—15' extending in parallelism part way into the shank 3 of the case to provide filling necks through which the spirit medium is introduced into the tubing, the latter being held in position within the case by suitable clamps 16.

The spirit medium consists of two non-miscible liquids 17 and 18 of different color; one of these liquids being placed in the tubing through the tube 12 and the other through the tube 12'. Subsequent to the introduction of the spirit medium, the open ends 15—15' of the tubings are closed by caps or stoppers 19. To provide for equalization of pressure at the ends of the tubing, a short connecting passage 20 is provided between the tube-ends 15—15'. Transparent kerosene and colored alcohol provide a satisfactory spirit medium, the specific gravity of the alcohol being adjusted to equal that of the kerosene. The glass tubing is so filled with these non-miscible liquids that in the level position of the instrument, as shown in Figure 1, the free surfaces of the liquids are at a convenient height in the larger tubes 12 and 12' corresponding to the zero graduation of a scale 21 etched on or otherwise associated with the tube 12. The line of separation between the two non-miscible liquids is preferably located at a suitable point in the smaller tube or coil 13 and serves as an indicator line or index 22 for indicating the travel of the liquid in the smaller tube.

The length of the smaller tube is such as to provide for measuring altitudes from 0 to 90 degrees and when making an observation or sight the instrument is tilted, as in Figure 2, with the sighting tube 4 aligned on a star or other point of observation and held in position a few seconds while the liquid attains a level or horizontal line. The angle of elevation of the sighting tube is then indicated by the scale 21. This scale need not actually be present and, since it is not sufficiently precise, its reading is magnified in the small tube or coil 13 by reason of the fact that as the surface of the liquid travels along the scale 21 the movement of the liquid index 22 in the smaller tube is greater in the ratio of the cross sectional area of the larger tube 12' to the cross sectional area of the smaller tube 13; the liquid index 22 in actual practice moving about an inch for every degree of inclination. The smaller tube is calibrated to permit direct reading, from a scale marked thereon or on an attached card, of the angle of elevation of the sight. The bubble level 11 provides means for checking the zero position of the liquid index. A normally open stop cock 23 is provided at any desired place in the path of the liquid, convenient for manual operation and is adapted when closed to prevent any change in the position of the liquid index while the reading of the angle is being noted. The instrument case is provided with a lid or cover 24 which is held in place by screws 25 and dowel pins 26. This lid provides protection for the glass tubing when the instrument is not in use and is removed from the case when the device is put to use in making astronomical observations. An integrally formed handle 27 on the back and left side of the case provides convenient means for holding the instrument in one hand when sighting the same or in carrying it about, leaving the right hand free to operate the stop cock.

In generally all sextants and similar instruments used in celestial navigation, the measure of the altitude of a celestial body is obtained by observing a reflection of its image superimposed upon a line of reference which is either a natural horizon such as provided by the sea, land, or clouds or an artificial horizon embodied within the instrument such as the well known bubble horizon. All such types are subject to fundamental errors which are aggravated when making observations from aircraft due to accelerations, etc., resulting from unsteadiness in flight. Such errors, as well as the complicated mechanical construction and the problem of illuminating the bubble horizon, are avoided or at least reduced to a minimum by the use of the liquid angle-measuring device, herein disclosed, which provides a means of viewing the celestial body direct instead of its reflection and, thus, eliminates the use of either the natural horizon or the bubble horizon.

Having thus described the invention, I claim:

1. An angle measuring device comprising the combination of sighting means and a liquid angle-indicator for indicating the angle of elevation of the sighting means, said indicator comprising two vertically disposed liquid-reservoirs of large diameter joined at their bottoms by a calibrated transparent connecting tube of small diameter, a body of liquid filling the said connecting tube and standing at a common level in the said reservoirs, said body of liquid being composed of two nonmiscible liquid components of equal specific gravity meeting in the said connecting tube with a visible line of separation therebetween serving as an angle index line.

2. An angle measuring device comprising the combination of sighting means and a liquid angle-indicator for indicating the angle of elevation of the sighting means and consisting of two vertical liquid conduits of large size connected by a liquid conduit of small size so that the movement of the liquid in the larger conduits is magnified several fold in the smaller conduit, the said smaller conduit being in the form of a coil and of a calibrated length sufficient to provide for magnification over a scale range from zero to ninety degrees, and a body of liquid filling the said coil and rising to a height in the said vertical conduits, said body consisting of two nonmiscible liquid components of equal specific gravity meeting in the said coil with a visible line of separation therebetween serving as an angle index line.

3. An angle measuring device comprising the combination with sighting means of a liquid angle-indicator including a continuous tube having a transparent calibrated portion and partly filled with two differently colored non-miscible liquids of equal specific gravity occupying relatively opposite sections of the tube but meeting therein with the visible line of separation therebetween normally in the calibrated portion of the tube and serving as a liquid index for indicating the angle of elevation of the sighting means, and means operative to prevent any change in the position of the liquid index during any change in the angular position of the device subsequent to taking a sight and while the reading of the angle of sight is being noted.

4. In an angle measuring device, the combination with sighting means of a liquid angle-indicator consisting of a glass tubing having two large liquid reservoir sections connected by a smaller indicator section and containing two non-miscible liquids of different color and equal specific gravity partly filling the reservoir sections with the line of separation within the smaller section and serving as an angle index line whereby the change in level position of the liquids in the larger sections is magnified in the smaller section in the ratio of the cross sectional area of the larger section to the cross sectional area of the smaller section, the said smaller section being calibrated to permit direct reading from a scale thereon of the angle of elevation of the sighting means.

5. An inclinometer and star altitude meter comprising a sighting member for viewing a celestial body, a liquid level combined with the sighting member for indicating the angle of elevation of the sighting member, said level comprising a calibrated coil of glass tubing consisting of two differently sized sections so arranged that the change in level position of a liquid in a larger section is magnified several fold in a smaller section; two non-miscible liquids of equal specific gravity meeting in said coil with the visual line of separaton therebetween within a smaller section to serve as an angle index line, and means for locking the liquid of the level against displacement so that the angle reading may be held until it is convenient to read it.

6. An inclinometer and star altitude meter comprising a body portion having a recess in one face and a handle on the opposite face, said body portion having its side edges converging and prolonged at one end of the cavity to provide a reduced shank, a sighting tube removably supported in said shank, a liquid level housed in the said cavity and consisting of a pair of large tubes connected at one end by a smaller tube in the form of a coil and containing two non-miscible liquids of different color so that any change in the level position of the liquids in the larger tubes is magnified several fold in the smaller tube and indicated by the line of separation between the liquids, and a stop cock arranged in the path of the liquid of the level and operable for locking the liquid against displacement and thereby holding the angle reading.

7. A liquid type inclinometer comprising liquid reservoirs connected at the top by an overflow tube and at the bottom by a graduated indicator tube, an angle scale associated with the indicator tube, a liquid of one color partly filling one reservoir and a liquid of a different color partly filling the other reservoir, said liquids being non-miscible and of the same specific gravity and meeting in the indicator tube with the line of separation therebetween serving as an angle index line.

GRANDISON GARDNER.